(12) United States Patent
Barkan et al.

(10) Patent No.: US 6,637,657 B2
(45) Date of Patent: Oct. 28, 2003

(54) COMPACT SCAN MODULE WITH MAGNETICALLY CENTERED SCAN MIRROR

(75) Inventors: Edward Barkan, Miller Place, NY (US); Howard M. Shepard, Great River, NY (US); Mark E. Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 7 days.

(21) Appl. No.: 09/898,237

(22) Filed: Jul. 3, 2001

(65) Prior Publication Data

US 2002/0145044 A1 Oct. 10, 2002

Related U.S. Application Data

(60) Provisional application No. 60/282,272, filed on Apr. 6, 2001.

(51) Int. Cl.[7] .................................................. G06K 7/10
(52) U.S. Cl. .................................................. 235/462.43
(58) Field of Search ........................ 235/462.35, 472.01, 235/471, 492, 462.37, 426.35, 470, 462.43; 359/196, 198, 210, 211, 214, 221, 213; 250/239

(56) References Cited

U.S. PATENT DOCUMENTS

| 1,202,446 A | 10/1916 | Speed |
| 1,552,186 A | 9/1925 | Anderson |
| 1,800,601 A | 4/1931 | Centeno |
| 1,873,926 A | 8/1932 | Centeno |
| 2,971,054 A | 2/1961 | Holt |
| 2,986,643 A | 6/1961 | Scanlon |
| 3,087,373 A | 4/1963 | Poor et al. |
| 3,532,408 A | 10/1970 | Dostal |
| 3,642,343 A | 2/1972 | Tchejeyan et al. |
| 3,981,556 A | 9/1976 | Sabatelli et al. |
| 3,998,092 A | 12/1976 | Maccabee |
| 4,019,026 A | 4/1977 | Nakanishi et al. |
| 4,021,096 A | 5/1977 | Dragt |
| 4,175,832 A | 11/1979 | Umeki et al. |
| 4,199,219 A | 4/1980 | Suzki et al. |
| 4,251,798 A | 2/1981 | Swartz et al. |
| 4,256,364 A | 3/1981 | Miinoura et al. |
| 4,369,361 A | 1/1983 | Swartz et al. |
| 4,387,297 A | 6/1983 | Swartz et al. |
| 4,409,470 A | 10/1983 | Shepard et al. |
| 4,460,120 A | 7/1984 | Shepard et al. |
| 4,496,831 A | 1/1985 | Swartz et al. |
| 4,516,017 A | 5/1985 | Hara et al. |
| 4,593,186 A | 6/1986 | Swartz et al. |
| 4,682,501 A | 7/1987 | Walker |
| 4,691,212 A | 9/1987 | Solcz et al. |
| 4,705,365 A | 11/1987 | Wakita et al. |
| 4,732,440 A | 3/1988 | Gadhok |
| 4,760,248 A | 7/1988 | Swartz et al. |
| 4,808,804 A | 2/1989 | Krichever et al. |

(List continued on next page.)

FOREIGN PATENT DOCUMENTS

| EP | 0 344 882 A2 | 2/1989 |
| EP | 0 471 291 A2 | 8/1991 |
| JP | 60-235277 | 11/1985 |

*Primary Examiner*—Karl D. Frech
*Assistant Examiner*—Edwyn Labaze
(74) *Attorney, Agent, or Firm*—Kirschstein, et al.

(57) ABSTRACT

A non-retroreflective compact scan module in an electro-optical reader includes a laser light source, a photosensor and an electromagnetic coil mounted at one surface of a printed circuit board. The laser emits a laser beam perpendicular to the board, and is redirected to an oscillatable scan mirror which is magnetically centered to a rest position when the coil is de-energized. Electrical circuitry is mounted at an opposite surface of the board.

14 Claims, 4 Drawing Sheets

U.S. PATENT DOCUMENTS

| | | | |
|---|---|---|---|
| 4,816,660 A | | 3/1989 | Swartz et al. |
| 4,816,661 A | | 3/1989 | Krichever et al. |
| 4,871,904 A | | 10/1989 | Metlitsky et al. |
| 4,882,476 A | | 11/1989 | White |
| 4,902,083 A | | 2/1990 | Wells |
| 4,919,500 A | | 4/1990 | Paulsen |
| 4,923,281 A | | 5/1990 | Krichever et al. |
| 4,962,980 A | | 10/1990 | Knowles |
| 4,974,918 A | | 12/1990 | Delache et al. |
| 5,099,110 A | | 3/1992 | Shepard et al. |
| 5,115,120 A | * | 5/1992 | Eastman ................ 235/462.35 |
| 5,168,149 A | | 12/1992 | Dvorkis et al. |
| 5,177,631 A | | 1/1993 | Orlicki et al. |
| 5,280,165 A | * | 1/1994 | Dvorkis et al. .............. 235/470 |
| 5,392,150 A | * | 2/1995 | Inagaki et al. .............. 359/221 |
| 5,486,944 A | * | 1/1996 | Bard et al. .................. 359/198 |
| 5,519,198 A | * | 5/1996 | Plesko ..................... 235/462.4 |
| 5,552,592 A | | 9/1996 | Dvorkis et al. |
| 5,559,319 A | * | 9/1996 | Peng ..................... 235/462.36 |
| 5,663,550 A | * | 9/1997 | Peng ..................... 235/462.39 |
| 5,705,799 A | * | 1/1998 | Li ......................... 235/462.43 |
| 5,786,585 A | * | 7/1998 | Eastman et al. ....... 235/462.15 |
| 5,880,452 A | * | 3/1999 | Plesko .................. 235/462.43 |
| 6,000,619 A | * | 12/1999 | Reddersen et al. .... 235/462.43 |

\* cited by examiner

COMPACT SCAN MODULE WITH MAGNETICALLY CENTERED SCAN MIRROR

CROSS-REFERENCE TO RELATED APPLICATIONS

This application claims the benefit of U.S. provisional patent application Ser. No. 60/282,272, filed Apr. 6, 2001.

BACKGROUND OF THE INVENTION

1. Field of the Invention

The present invention generally relates to electro-optical readers or scanners, such as bar code symbol readers and, more particularly, to a scan module for use in applications requiring particularly compact readers.

2. Description of the Related Art

Electro-optical readers, such as bar code symbol readers, are now very common. Typically, a bar code symbol comprises one or more rows of light and dark regions, typically in the form of rectangles. The widths of the dark regions, i.e., the bars, and/or the widths of the light regions, i.e., the spaces, between the bars indicate encoded information to be read.

A bar code symbol reader illuminates the symbol and senses light reflected or scattered from the coded regions to detect the widths and spacings of the coded regions and derive the encoded information. Bar code reading type data input systems improve the efficiency and accuracy of data input for a wide variety of applications. The ease of data input in such systems facilitates more frequent and detailed data input, for example, to provide efficient inventories, tracking of work in progress, etc. To achieve these advantages, however, users or employees must be willing to consistently use the readers. The readers, therefore, must be easy and convenient to operate.

A variety of scanners is known. One particularly advantageous type of reader is an optical scanner which scans a beam of light, such as a laser beam, across the symbols. Laser scanner systems and components of the type exemplified by U.S. Pat. Nos. 4,387,297 and 4,760,248, which are owned by the assignee of the instant invention and are incorporated by reference herein, have generally been designed to read indicia having parts of different light reflectivity, i.e., bar code symbols, particularly of the Universal Product Code (UPC) type, at a certain working range or reading distance from a hand-held or stationary scanner.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternative circumferential directions about a drive shaft on which the multi-mirror construction is mounted. All of the above-mentioned U.S. patents are incorporated herein by reference.

In electro-optical scanners of the type discussed above, a "scan engine" or scan module includes a laser source, optics, a scan mirror, a drive to oscillate the scan mirror, a photodetector, and associated signal processing and decoding circuitry. All of these components add size and weight to the scan module and, in turn, to the scanner. Reference may be had to U.S. Pat. Nos. 5,099,110; 5,168,149; 5,504,316; 5,262,627; 5,367,151; and 5,682,029, all owned by the assignee of the instant invention and incorporated herein by reference thereto, for details of scan modules.

In applications involving protracted use, a large, heavy, hand-held scanner can produce user fatigue. When use of the scanner produces fatigue or is in some other way inconvenient, the user is reluctant to operate the scanner. Any reluctance to consistently use the scanner defeats the data gathering purposes for which such bar code systems are intended.

Also, a need exists for compact scanners to fit into small compact devices, such as cellular telephones, personal digital assistants, notebooks, pen-shaped instruments, and ring scanners worn on the user's finger. These devices need to be as small as possible, and the scan modules need to be made significantly smaller than would be necessary if ease of use was the only requirement.

Manufacturers of these compact devices use advanced manufacturing techniques to minimize their size. Even if no scanner is to be installed, these devices can be larger than many users would desire. When a scanner is installed in such compact devices for increased functionality, the scanning of bar code symbols is typically not the primary purpose for which the device is used. Hence, to justify its placement in the device, the scanner and the scan engine must be as small and inexpensive as possible.

Thus, an ongoing objective of bar code reader development is to miniaturize the reader as much as possible, and a need still exists to further reduce the size, weight and cost of the scan module. The mass of the moving components should be as low as possible to minimize the power required to produce the scanning movement.

It is also desirable to modularize the scan module so that a particular module can be used in a variety of different scanners. A need exists, however, to develop a particularly compact, lightweight module which contains all the necessary scanner components.

SUMMARY OF THE INVENTION

Objects of the Invention

Accordingly, it is a general object of this invention to reduce the size, weight and cost of components used to produce scanning motion of the light beam, and to collect the reflected light from the indicia.

More particularly, it is an object of the present invention to develop an electro-optical scanning system which is both smaller in size and lighter in weight.

It is yet another object of the present invention to produce a scan module which is manufactured conveniently, and at a low cost.

A related object is to provide a scan module which is assembled easily.

An additional object is to reliably center the scan mirror used in such scan modules.

FEATURES OF THE INVENTION

In keeping with the above objects and others which will become apparent hereinafter, one feature of the present invention resides, briefly stated, in a scan module for use in a reader for electro-optically reading indicia. The module has a support. A generally planar base, preferably a printed circuit board, is mounted on the support. A laser light source is also mounted on the support and is operative for emitting a laser beam in a direction generally perpendicular to the base. A scan mirror is mounted on the support for oscillating movement. Optical means is mounted on the support for changing the direction of the laser beam, and for directing the laser beam to the scan mirror for reflection therefrom toward the indicia. A drive is mounted on the support for oscillating the scan mirror to sweep the laser beam across the indicia for scattering therefrom. A sensor is mounted on the support for detecting scattered light from the indicia, and for generating an electrical signal corresponding to the detected scattered light and indicative of the indicia.

Preferably, the optical means includes a fold mirror for changing the direction of the laser beam by 90°, and a focusing element and an aperture together operative for focusing the laser beam at a focus located remotely at a working distance from the scan mirror. The focusing element is mounted for movement on the support to an adjusted position, and is fixed in said adjusted position. The focusing element is mounted between the fold mirror and the scan mirror. The emission of the laser beam perpendicular to the base allows for a highly compact configuration.

Preferably, the scan mirror is mounted on a hub for joint oscillation therewith by the drive about an axis along which a shaft extends. Either the hub or the shaft may be the oscillating member. Alternatively, both the shaft and the hub may freely oscillate. The hub may be integral with the shaft which is journaled on the support in bearings having crowned thrust surfaces.

Another feature resides in magnetically centering the scan mirror. A permanent magnet is also mounted on the hub for joint oscillation with the scan mirror. The permanent magnet is a bar magnet having a magnetic axis. An energizable electromagnetic coil is mounted on the support and has an electromagnetic axis extending generally perpendicular to the magnetic axis in a rest position of the scan mirror. Energization of the coil causes magnetic fields of the coil and the magnet to interact and oscillate the hub and the scan mirror.

In accordance with this feature, the scan mirror is centered in the rest position upon de-energization of the coil, by using a pole piece having a pair of ferromagnetic portions mounted on the support and spaced apart along the magnetic axis of the permanent magnet. The poles of the permanent magnet are magnetically attracted to the ferromagnetic portions, thereby aligning the permanent magnet to the pole piece. Thus, the rest position is accurately established.

It is further advantageous where the photodetector is mounted at one surface of the printed circuit board and has surface-mounted connectors for making an electrical connection at said one surface of the printed circuit board. This allows more room for circuitry on the opposite surface of the board, since it is no longer necessary to occupy the opposite board surface with pins projecting through the board.

Thus, in accordance with this invention, the laser light source, the coil and the photodetector are all mounted at the same major surface of the printed circuit board. Signal processing circuitry for processing the electrical signal are advantageously mounted at another surface of the printed circuit board opposite to the major surface. Also, power and regulation circuitry is provided on the other surface of the printed circuit board for supplying electrical power to the laser light source, the coil and the photodetector.

The positioning of the laser light source, the focusing optis for focusing the laser beam emitted by the light source, the photodetector, the collection optics for collecting the reflected light, and the drive, especially the magnet and the coil, has been made to eliminate unused volume inside the module and to reduce the overall volume. Assembly cost is minimized by enabling standard assembly equipment, such as those being used to place components on printed circuit boards, to be employed. For example, both the coil and the photodetector can be surface mounted on the same side of the printed circuit board as the support. This leaves more space on the other side of the board to be occupied by other components.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
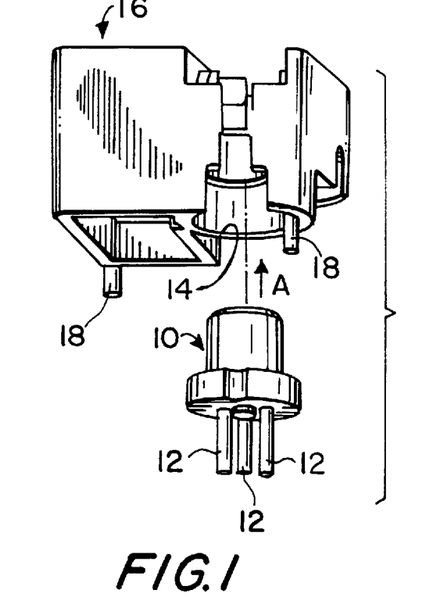
FIG. 1 is an exploded, perspective view of a laser diode being mounted in a support.

Referring now to the drawings, reference numeral 10 in FIG. 1 identifies a light source, preferably a semiconductor, solid-state, laser packaged in a can having a plurality of pins 12 projecting from a bottom can wall, and operative when electrically energized for emitting a laser beam, preferably visible, through an aperture in an upper wall of the can. The can 12 is inserted in the direction of arrow A in a cylindrical bore 14 in a support or chassis 16 having a plurality of mounting posts 18 that are inserted into corresponding mounting holes extending through a generally planar base 20 depicted in FIG. 6, and advantageously being a printed circuit board (PCB) that underlies and is supported by the chassis 16. The chassis 16 supports the laser 10 and all the other components of a scan module or engine, as described below.

Figure 7:
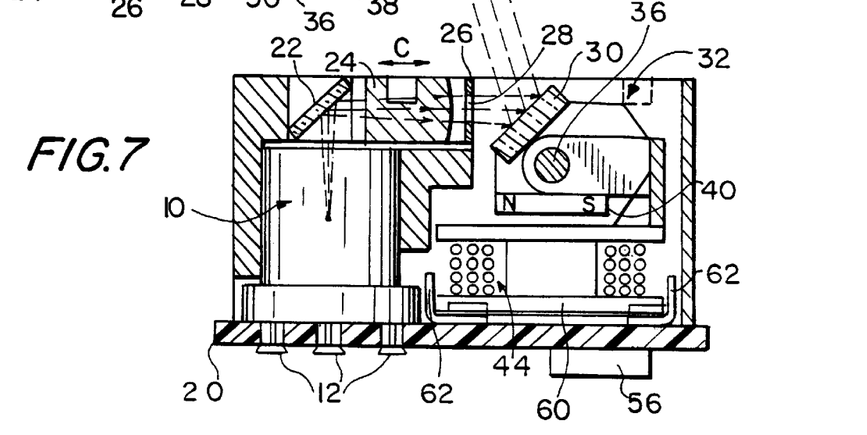
FIG. 7 is a sectional view of the scan engine of FIG. 6.
Figure 8:
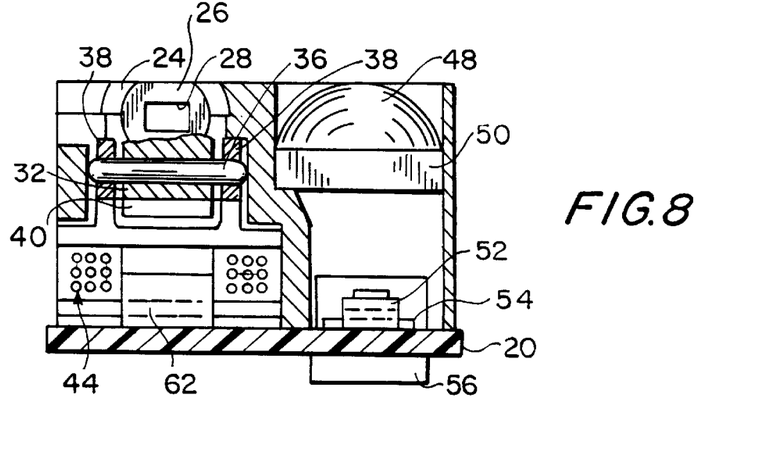
FIG. 8 is another sectional view of the scan engine of FIG. 6.

As shown in FIG. 7, the bottom can wall rests above an upper surface of the PCB, and the laser 10, which is preferably bonded in the bore 14, emits its laser beam in a direction generally perpendicular to the PCB, e.g., vertically upwardly. The chassis 16 determines the position of the laser 10. Once the pins 12 are inserted through mounting holes in the PCB, the pins 12 are soldered at a lower surface of the PCB. A fold mirror 22 is fixedly mounted on the chassis 16 at an angle of 45° and changes the direction of the laser beam so that the laser beam reflected from the fold mirror 22 is generally horizontal and parallel to the PCB.

Figure 2:
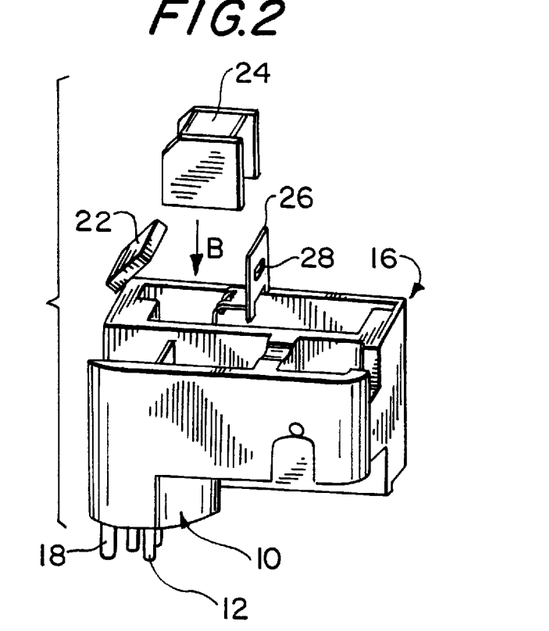
FIG. 2 is an exploded, perspective view of laser optics being mounted in the support.

The horizontal laser beam passes through a focusing lens 24 and an aperture stop 26 having an aperture 28 which together serve to focus the laser beam at a focus situated at a selected working distance from the module. The fold mirror, focusing lens and aperture stop are shown separately in FIG. 2 during their assembly on the chassis 16 in the direction of arrow B. The focusing lens is slidable in the direction of arrow C in FIG. 7 in order to adjust the focus to the selected distance and, once adjusted, the focusing lens is bonded in place.

After passing through the aperture 28, the laser beam is incident on a scan mirror 30 for reflection therefrom transversely of the PCB in the direction of arrows D in FIG. 7 toward indicia, such as a bar code symbol. As shown in the exploded view of FIG. 3 and in the assembled view of FIG. 4, the scan mirror 30 is mounted on a hub 32, and is bonded to an inclined wall 34 of the hub. The hub 32 is oscillatable about an axis that extends along a shaft 36. Either the hub or the shaft is the oscillating member. Alternatively, both the shaft and the hub may freely oscillate. The hub may be integral with the shaft which is journaled in bearings provided on the chassis. A permanent magnet 40 is fixedly mounted on a horizontal bottom wall of the hub. As shown in FIG. 7, the magnet is preferably an elongated bar magnet having north (N) and south (S) poles at opposite ends and defining a generally horizontal magnetic axis extending lengthwise of the magnet. The magnet could have other shapes, such as square.

Figure 9:
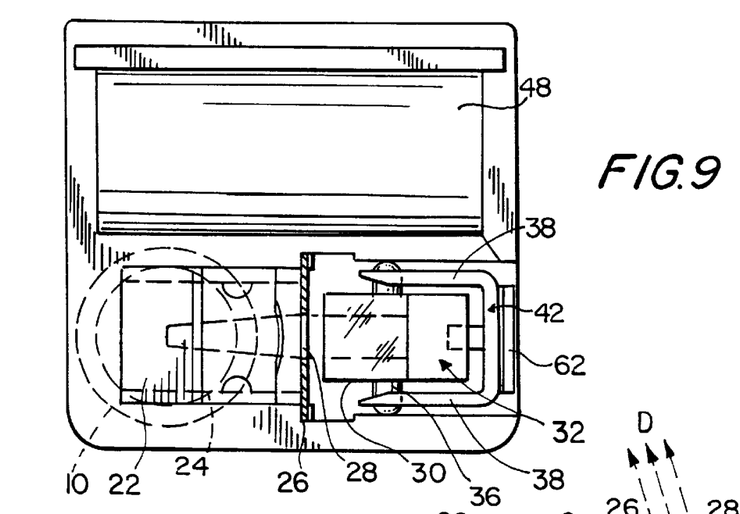
FIG. 9 is a top plan view of the scan engine of FIG. 6.

As best seen in FIG. 9, the opposite ends of the shaft 36 are fixed to a pair of arms 38 of a U-shaped yoke 42. The yoke can be mounted on the chassis. As shown in FIG. 7, the scan mirror 30, together with the hub and the magnet, are in a rest or equilibrium position, in which the scan mirror is oriented at about a 45° angle to the horizontal or plane of the PCB, and in which the magnet lies in a plane generally parallel to the PCB.

Figures 3, 4:
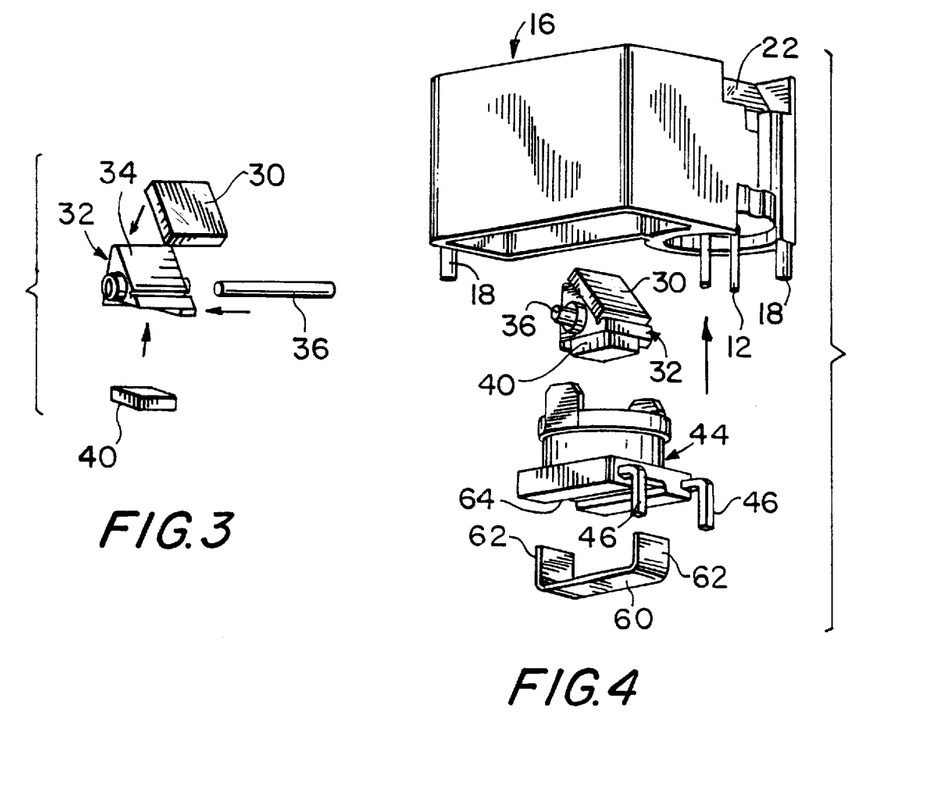
FIG. 3 is an exploded, perspective view of a scan mirror structure.
FIG. 4 is an exploded, perspective view of the scan mirror structure, a coil assembly and a pole piece being mounted on the support.

The magnet 40 is part of a drive for repetitively oscillating the scan mirror 30 back and forth in opposite circumferential directions about the shaft 36. The drive includes an electromagnetic coil 44 which, as seen in FIG. 4, has a pair of pins 46 that extend through holes in the PCB. The coil has a bobbin on which the yoke 42 may be supportably mounted. The coil 44 rests on, or slightly above, the upper surface of the PCB and, when energized by an energizing signal conducted through the pins 46, has a generally vertical electromagnetic axis that interacts with the generally horizontal magnetic axis of the magnet. The energizing signal is periodic and changes direction, for example, a sinusoidal or a triangular waveform, so that the magnet 40 and, in turn, the hub and the scan mirror, are oscillated back and forth at a drive frequency.

The oscillation of the scan mirror 30 causes the laser beam incident thereon to be swept across the indicia to be read. A portion of the light scattered off the indicia returns to the module and is collected by a collection lens 48, for example, semi-cylindrical, mounted in an adjacent compartment on the chassis remote from and bypassing the scan mirror.

Figure 5:
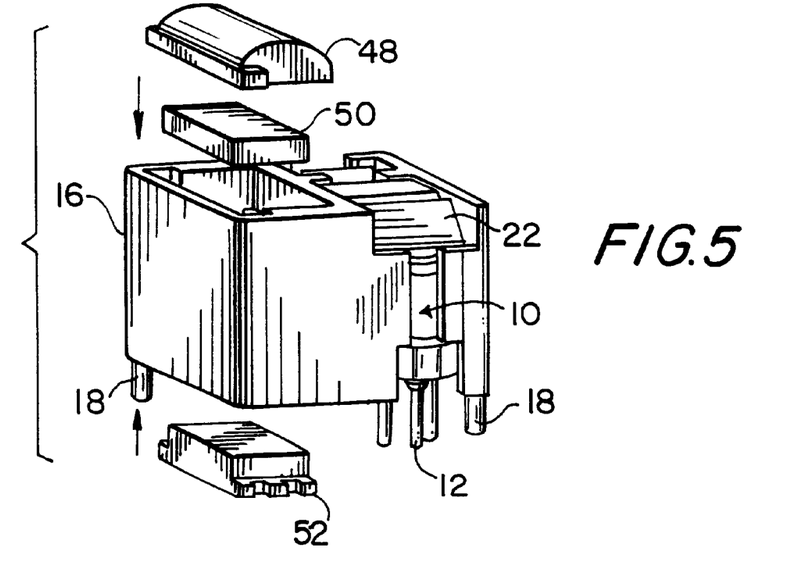
FIG. 5 is an exploded, perspective view of a photodetector and collection optics being mounted on the support.
Figure 6:
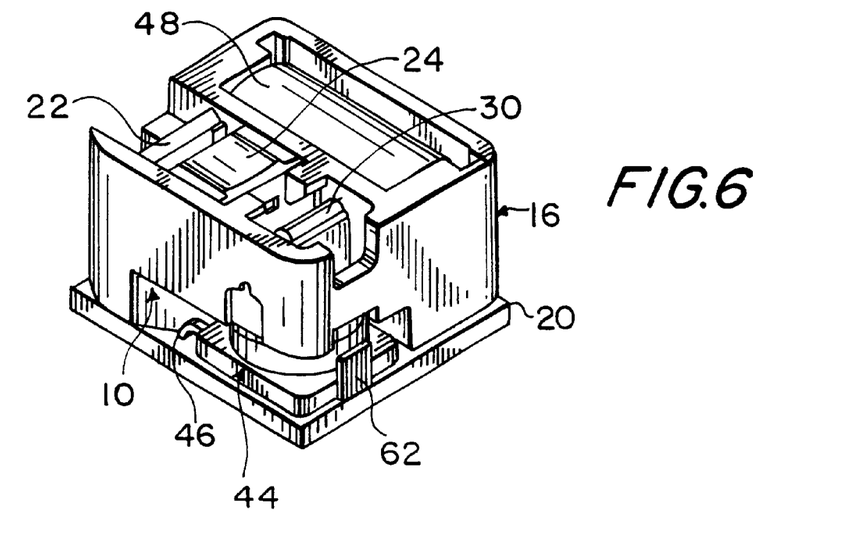
FIG. 6 is a perspective view of the assembled scan engine mounted on a printed circuit board.

Preferably, both surfaces of the collection lens have curvature to minimize aberration for maximum collection efficiency. The collected light passes through an optical bandpass filter 50 underneath the lens 48 and is directed to a sensor, preferably a photodiode 52 mounted on the upper surface of the PCB. The lens 48, filter 50 and photodiode 52 are shown in FIG. 5 during their assembly on the chassis. The completed assembly is shown in FIG. 6.

The photodiode has surface terminals 54 for surface mounting the photodiode on the upper surface of the PCB. Thus, the area on the lower surface of the PCB directly opposite the photodiode is available to support additional electronic circuitry, such as signal processing circuitry 56. It will be appreciated that if the photodiode had pins (for example, like laser pins 12 or coil pins 46), then the area on the lower surface of the PCB would have to accommodate such photodiode pins and the signal processing circuitry 56, or some other circuitry, would have to be located elsewhere. The signal processing circuitry 56 is operative for processing an electrical signal generated by the photodiode in response to detection of the scattered light. The electrical signal starts as an analog signal which is then digitized and, optionally, decoded into data descriptive of the indicia being read.

If room for additional circuitry is needed, then the area on the lower surface of the PCB which is directly opposite the coil 44 need not be occupied by the pins 46, but instead, the coil 44 may be provided with surface contacts. The same is true for the laser pins 12. The rest of the lower surface of the PCB is used to accommodate power and regulation circuitry for the laser 10, the coil 44 and the photodetector 52. Optionally, a radio frequency transmitter and an antenna can be provided on the PCB to transmit the electrical signal, particularly after being processed, to a remote host by wireless transmission.

Additional cost and size can be removed by mounting the bare die of the photodiode on the PCB, thus eliminating the package or housing of the photodiode. This so-called "chip-on-board" design makes the photodiode smaller and eliminates the cost of the package.

The photodiode must be accurately positioned because small errors in position causes the field of view to point in the wrong direction. In order to make the photodiode placement more tolerant, and to minimize the field of view requirement, the chassis is made with an aperture 82 positioned just above the light sensitive surface of the photodiode. The sensitive surface is made larger than the aperture so that even if the photodiode is not perfectly positioned, the part of the sensitive surface visible through the aperture determines the size, shape and position of the field of view. Since the aperture is an integral part of the chassis, it is accurately positioned relative to the collection lens which, in turn, is accurately positioned with respect o the laser 10 and the scan mirror 30.

The chassis thus supports all the components in the correct optical alignment. To that end, the chassis is precision molded of a synthetic plastic material.

The module of FIG. 6 has a generally parallelepiped shape and occupies a volume of about 8.8 mm×9.8 mm×5.7 mm. The PCB is approximately 9 mm×12 mm. It is extremely compact for a non-retroreflective scan engine, that is, one where the returning scattered light is not collected via a path that passes through the scan mirror. The collection area is nearly half of the whole front surface area of the chassis.

Returning to FIG. 4, an elongated pole piece 60 made of a ferromagnetic material, such as iron, has a pair of bent end portions 62 spaced apart of each other. The pole piece is fitted into a slot 64 on the underside of the bobbin of the coil 44, and is fixedly supported thereon above the upper surface of the PCB. The pole piece portions 62 magnetically attract the poles of the magnet 40 to urge the latter to the rest position. Once the coil is de-energized, the magnet 40 will automatically return the scan mirror to the rest position due to the constant magnetic attraction between the poles and the pole piece portions. This automatic centering is useful for electro-optical alignment purposes.

An alternative centering technique uses two separate magnetic pieces or separate magnets placed apart to center the rotor magnet 40 therebetween.

Figure 10:
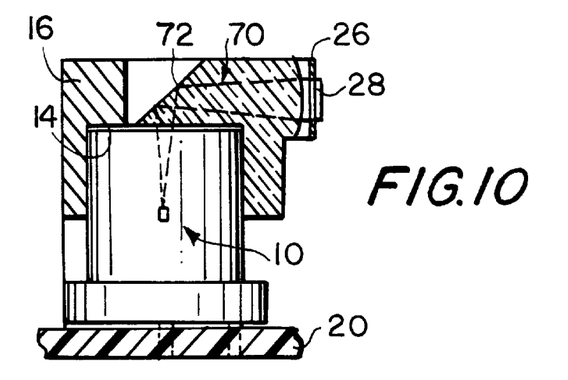
FIG. 10 is a broken-away view of a modification of the scan engine.

FIG. 10 depicts a modification. Rather than configuring the fold mirror 22 and the focusing lens 24 as separate elements and requiring the focusing lens 24 to be adjustably moved, a prism 70 can be employed. The prism 70 has a totally internally reflecting surface 72 inclined at an angle of 45°. In this modification, the laser 10 is adjustably moved within its bore 14 to obtain the focus at the desired location. The prism is constituted of an optical material for focusing the laser beam passing therethrough.

Figure 11:
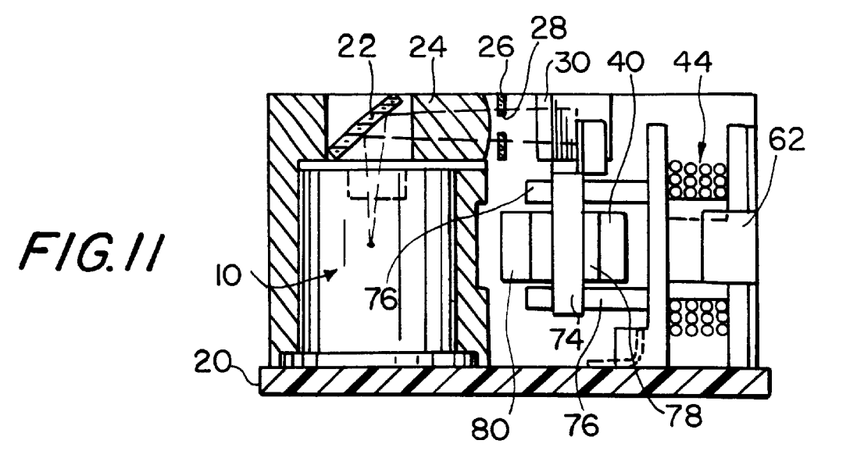
FIG. 11 is a view analogous to FIG. 7, but of another embodiment of the scan engine.
Figure 12:
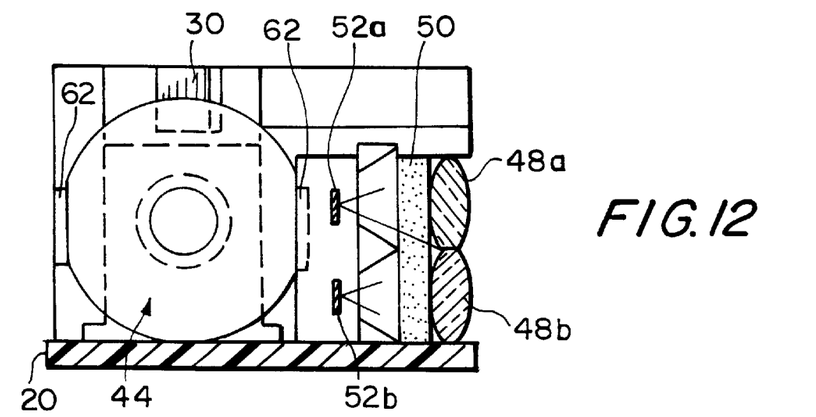
FIG. 12 is a view analogous to FIG. 8, but of the embodiment of FIG. 11.

FIGS. 11 and 12 depict still another modification wherein the outgoing laser beam and the returning scattered light travel along respective paths that are generally parallel to the PCB 20, rather than along respective paths that are generally transverse and generally perpendicular to the PCB 20 as in the case of the embodiments of FIGS. 1–10.

Employing like reference numerals, the FIGS. 11–12 embodiment depicts the laser 10 emitting the laser beam at the fold mirror 22 and through the focusing lens 24 and the aperture 28 of the aperture stop 26 before striking the scan mirror 30. The scan mirror 30 is mounted at an upper end of a vertical shaft 74 that is journaled on a pair of spaced-apart arms 76. A hub 78 is mounted on the shaft 74. The permanent magnet 40 is mounted at one side of the hub 78. A counterweight 80 is mounted at the other side of the hub to balance the weight of the magnet 40.

The coil 44 is mounted so that its electromagnetic axis is generally parallel to the PCB, but still perpendicular to the magnetic axis of the magnet 40. Upon energization of the coil 44, the magnet 40 is oscillated, thereby oscillating the hub and the scan mirror 30 which, in this configuration, sweeps the laser beam incident thereon in a direction generally parallel to the PCB.

As shown in FIG. 12, a portion of the scattered light returning from the indicia in a direction generally parallel to the PCB is collected by a pair of cylindrical collection lenses 48a, 48b, is thereupon filtered by the optical filter 50, and is detected by a pair of photodiodes 52a, 52b. Ferromagnetic pole piece portions 62 magnetically attract the opposite poles of the magnet 40 to restore the scan mirror 30 to the rest position, as described above.

Coil 44 in each embodiment has a central circular opening 82 (see FIG. 12) whose diameter is smaller than the length of the bar magnet 40. The magnet 40 does not enter the opening 82, but is positioned in operational proximity to the coil, thereby allowing for a highly compact configuration for the scan module.

The lower side of the PCB carries both analog and digital circuitry, preferably combined into a single integrated circuit. The PCB for this scan module is so small (9 mm×12 mm) that there would not be room for an analog application specific integrated circuit (ASIC) and a separate decode microprocessor, as has been employed in the past.

It will be understood that each of the elements described above, or two or more together, also may find a useful application in other types of constructions differing from the types described above.

While the invention has been illustrated and described as embodied in a compact scan module with a magnetically centered scan mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A scan module for use in a reader for electro-optically reading indicia, comprising:
   a) a support;
   b) a light source mounted on the support, and operative for producing a light beam;
   c) a scan mirror mounted on the support for oscillating movement between opposite end-limiting positions;
   d) optical means mounted on the support, and operative for directing the light beam from the source to the scan mirror for reflection therefrom toward the indicia;
   e) a permanent magnet mounted on the scan mirror for joint oscillating movement therewith, the permanent magnet having opposite magnetic poles spaced apart along a magnetic axis;
   f) a drive, including an energizable electromagnetic coil mounted on the support, and operative for magnetically interacting with the permanent magnet when energized, and for oscillating the scan mirror between the end-limiting positions to sweep the light beam in a scan across the indicia for reflection therefrom;
   g) a collection lens mounted on the support, and operative for collecting light reflected from the indicia;
   h) a sensor mounted on the support, and operative for detecting light collected by the collection lens, and for generating an electrical signal related to the indicia being read; and
   i) a pole piece having a pair of ferromagnetic material pole portions mounted on the support and spaced apart along the magnetic axis, the poles of the permanent magnet being magnetically attracted to the pole portions for centering the scan mirror in a rest position between the end-limiting positions when the coil is not energized.

2. The module of claim 1, wherein the support is three-dimensional and measures 8.8 mm by 9.8 mm by 5.7 mm in volume.

3. The module of claim 1, wherein the support includes a printed circuit board mounted at one side of the support, and wherein the scan mirror sweeps the light beam beyond an opposite side of the support, and wherein the collection lens collects light passing through said opposite side of the support.

4. The module of claim 3, wherein the light source is a laser diode having diode pins, and wherein the coil has coil pins, and wherein the board has holes through which at least one of the pins extends.

5. The module of claim 3, wherein the sensor is a photodetector having surface-mounted connectors for making an electrical connection at one surface of the board, and further comprising electrical circuitry mounted at an opposite surface of the board directly below the photodetector.

6. The module of claim 5, wherein the electrical circuitry is signal processing circuitry for processing the electrical signal.

7. The module of claim 5, wherein the electrical circuitry is power circuitry for supplying electrical power to one of the light source, the coil and the sensor.

8. The module of claim 1, and further comprising a hub on which the scan mirror and the permanent magnet are mounted.

9. The module of claim 8, wherein the hub is journaled on the support.

10. The module of claim 1, wherein the optical means includes a fold mirror for changing the direction of the light beam by 90°, and a focusing element and an aperture operative for focusing the light beam at a focal point located remotely from the support.

11. The module of claim 1, wherein the optical means is a prism having an internal totally reflecting surface for changing the direction of the light beam by 90°, and is constituted of a focusing material for focusing the light beam at a focal point located remotely from the support.

12. The module of claim 1, wherein the coil has a bobbin formed with a slot in which the pole piece is mounted.

13. The module of claim 1, wherein the collection lens has a semicylindrical surface facing exteriorly of the support.

14. An arrangement for centering an oscillatable scan mirror in a rest position in a reader for electro-optically reading indicia, comprising:

a) a support;

b) a permanent magnet having opposite magnetic poles spaced apart along a magnetic axis;

c) a hub on which the scan mirror and the magnet are mounted for joint oscillating movement relative to the support between opposite end-limiting positions;

d) an energizable electromagnetic coil mounted on the support, and operative for magnetically interacting with the magnet when energized, and for oscillating the scan mirror between the end-limiting positions to sweep a light beam incident on the scan mirror in a scan across the indicia during reading; and e) a pole piece having a pair of ferromagnetic material pole portions mounted on the support and spaced apart along the magnetic axis, the poles of the permanent magnet being magnetically attracted to the pole portions for centering the scan mirror in a rest position between the end-limiting positions when the coil is not energized.

* * * * *